(12) United States Patent
Mohamadi (10) Patent No.: US 9,419,476 B2
(45) Date of Patent: Aug. 16, 2016

(54) FLAT PANEL, STATIONARY OR MOBILE, SPATIALLY BEAM-FORMED WIRELESS ENERGY DELIVERY SYSTEM

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 502 days.

(21) Appl. No.: 13/934,160

(22) Filed: Jul. 2, 2013

(65) Prior Publication Data

US 2014/0015344 A1 Jan. 16, 2014

Related U.S. Application Data

(60) Provisional application No. 61/670,019, filed on Jul. 10, 2012.

(51) Int. Cl.
*H02J 17/00* (2006.01)
*H01Q 1/24* (2006.01)
*H02J 7/02* (2016.01)

(52) U.S. Cl.
CPC ................ *H02J 17/00* (2013.01); *H01Q 1/248* (2013.01); *H02J 7/025* (2013.01)

(58) Field of Classification Search
CPC ..................................................... H01Q 1/248
See application file for complete search history.

(56) References Cited

U.S. PATENT DOCUMENTS

| | | | | |
|---|---|---|---|---|
| 7,446,601 | B2 * | 11/2008 | LeChevalier | H01J 3/36 315/364 |
| 2008/0265087 | A1 * | 10/2008 | Quinn | B64B 1/00 244/30 |
| 2009/0294576 | A1 * | 12/2009 | LaForge | H01M 8/0656 244/30 |
| 2010/0026603 | A1 * | 2/2010 | McSpadden | H01Q 1/248 343/872 |
| 2010/0284086 | A1 * | 11/2010 | Novack | H01Q 1/248 359/580 |

* cited by examiner

*Primary Examiner* — Jared Fureman
*Assistant Examiner* — Joel Barnett
(74) *Attorney, Agent, or Firm* — Haynes and Boone, LLP (57) ABSTRACT

Methods and systems are provided for achieving delivery of power wirelessly using a highly beam-formed array of radio frequency (RF) transmitters as a source and a spatially beam-formed array of receivers that collect the impinged RF power and feed a multistage RF to direct current (RF-DC) conversion circuit that, for example, increases output voltage by doubling the voltage at each stage, while power delivery remains constant. One or more embodiments may provide energy wirelessly and—unlike conventional systems where the power flux density may be too low for applications where an energy density (specific energy) on the order of several mega-Joules per kilogram (MJ/Kg) is desired—may provide sufficient power flux density for many practical applications.

20 Claims, 7 Drawing Sheets

FLAT PANEL, STATIONARY OR MOBILE, SPATIALLY BEAM-FORMED WIRELESS ENERGY DELIVERY SYSTEM

CROSS REFERENCE TO RELATED APPLICATIONS

This application claims the benefit of priority from U.S. Provisional Patent Application No. 61/670,019, filed Jul. 10, 2012, which is incorporated by reference.

BACKGROUND

1. Technical Field

Embodiments of the present invention generally relate to energy delivery systems and, more particularly, to a wireless energy delivery system employing spatial beam forming of radio frequency (RF) radiation.

2. Related Art

Energy harvesting for producing electricity from ambient energy can be accomplished by converting energy from a number of different forms, for example, including light energy (e.g., photovoltaic conversion of sunlight, for example, using solar cells); acoustic energy (e.g., piezoelectric conversion of sound waves or mechanical vibrations); and thermal energy (e.g., thermoelectric conversion using Seebeck effect). Electrical energy from radio frequency (RE) radiation can also be harvested. Sources of ambient RF energy may include, for example, broadband microwave band and mobile telephone base station emissions. Power can also be provided, in addition to or instead of being harvested, to a device by transmission of RE radiation. Power density measurement of such emissions reveals, however, that the power flux density (typically measured in units of milli-Watts per square centimeter or $mW/cm^2$) is too low for most practical applications.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for achieving delivery of power wirelessly, using a highly beam-formed array of radio frequency (RF) transmitters as a source and a spatially beam-formed array of receivers that collect the impinged RF power and feed a multistage RF to direct current (RF-DC) conversion circuit that, for example, increases output voltage by doubling the voltage at each stage, while power delivery remains constant. One or more embodiments may provide energy wirelessly and, unlike conventional systems where the power flux density may be too low for applications where an energy density (specific energy) on the order of several mega-Joules per kilogram (MJ/Kg) is desired, may provide sufficient power flux density for many practical applications. In one or more embodiments, such wireless energy delivery systems may be useful, for example, for delivering power (e.g., for recharging batteries) to unmanned aerial vehicles (UAV) that may find use for many purposes—such as remote monitoring of gas and oil pipelines and establishment of communication links in remote areas.

One or more embodiments may be useful where energy delivery is needed at any time of the day or night, every day of the year. In one or more embodiments, fog, smog, and rainy conditions are transparent to the energy delivery system, which may remain functional in all weather conditions. In one or more embodiments, the beam-formed arrays for transmitters and receivers may be configured as thin flat panels, in contrast to more conventional bulky radiation dishes. Thus, energy delivery systems according to one or more embodiments may be light weight and easy to transport and install in stationary or mobile platforms, e.g., a UAV docking station (transmitter) or the UAV itself (receiver). One or more embodiments may be of practical size for implementation of active array transmission (TX) and passive array reception (RX). In one or more embodiments, spatial beam forming provides beam energy at the surface of the receiver array so that power is uniformly distributed over the entire array surface, improving safety for personnel (no "zapping"). Implementation of embodiments may benefit by the availability of commercial off-the-shelf (COTS) components in gallium-arsenide (GaAs), gallium-nitride (GaN), indium-phosphide (InP), and silicon-germanium (SiGe).

In one or more embodiments, integration of multiple arrays (typically 512×512 and 1024×1024 antenna arrays) of each sensor (e.g., the transmitters and receivers) may enable an energy delivery system to operate at the W-band (e.g., about 75-110 gigahertz (GHz)) also referenced as E-band (including two bands at about 71-76 GHz and 81-86 GHz). In one or more embodiments, the energy delivery system may be expanded to terahertz (e.g., about 300-3000 GHz frequency bands) implementations. The transmitters for one or more embodiments of an energy delivery system may use continuous wave (CW) transmission. One or more embodiments may also use ultra wide band (UWB) coded pulse train transmission that can exceed 80 GHz. Transmitters and receivers for the energy delivery system may use ultra wideband (UWB) radar systems that employ wafer scale (e.g., less than 4.0 inches (10.0 centimeters (cm)) in side dimension for the antenna array) active array antennas.

One or more embodiments may include implementation of an active antenna array (e.g., antenna-amplifier array) including a fully integrated feed network with associated power amplifiers that transmit (or low noise amplifiers to receive) a radar signal in X-band (e.g., about 8-12 giga-Hertz (GHz)), V-band (e.g., about 40-75 giga-Hertz (GHz)), E-band, W-band, or terahertz frequency bands.

One or more embodiments may incorporate or employ various features as disclosed in U.S. Pat. No. 7,839,283, issued Nov. 23, 2010, to Mohamadi; U.S. Pat. No. 7,042,388, issued May 9, 2006, to Mohamadi; and U.S. Pat. No. 6,963,307, issued Nov. 8, 2005, to Mohamadi, all of which are incorporated by reference. One or more embodiments also may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference. Wafer scale antenna modules (WSAM) are disclosed by U.S. Pat. No. 7,884,757, issued Feb. 8, 2011, to Mohamadi et al. and U.S. Pat. No. 7,830,989, issued Nov. 9, 2010 to Mohamadi, both of which are incorporated by reference.

Figure 1:
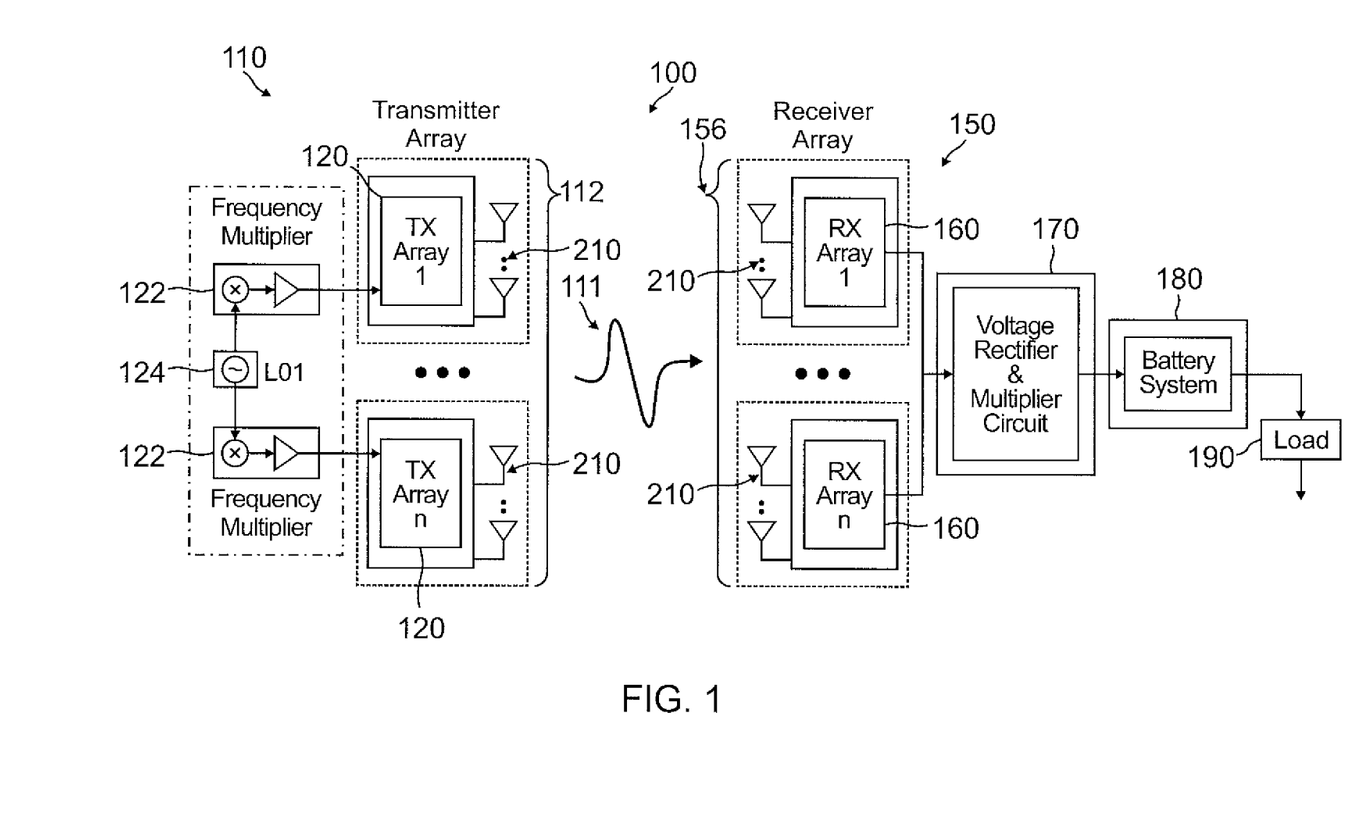
FIG. 1 is a system block diagram illustrating a radio frequency (RF) transmitter and receiver for a wireless energy delivery system, in accordance with an embodiment of the present disclosure.

FIG. 1 illustrates a radio frequency (RF) transmitter 110 and receiver 150 (e.g., sensor unit) for a wireless energy delivery system 100 in accordance with an embodiment. Referring to FIG. 1, wireless energy delivery system 100 may include a transmitter 110 for supplying power in the form of RE radiation in a signal 111 (also referred to as "RF energy" 111) to a receiver 150. Receiver 150 may receive RF signal 111 and gather power or energy, in the form of RF radiation from signal 111, from transmitter 110. Transmitter 110 may include an array 112 of transmitters 120. Similarly, receiver 150 may include an array 156 of receivers 160 (receivers 160 may also be referred to collectively with transmitters 120 as "sensors", e.g., sensors 120, 160).

Each transmitter 120 of the array 112 may be fed energy by a respective frequency multiplier 122 that converts a signal from a local oscillator 124. The energy, or signal, fed to each transmitter 120 may have the form, for example, of a continuous wave (e.g., non-pulsed) signal for continuous wave (CW) transmission whose frequency can, for example, exceed 80 GHz. Also, for example, the energy, or signal, fed to each transmitter 120 may have the form, for example, of an ultra wide band (UWB) coded pulse train transmission whose frequency, or pulse repetition rate, can, for example, exceed 80 GHz.

On the receiver 150 side, each receiver (or sensor) 160 of receiver 150 may feed the received energy to a voltage rectifier and multiplier circuit 170 (see FIG. 3) that may include a matching network for maximizing the power transfer between the antennas of array 156 of receivers 160 and the voltage rectifier, by matching the antenna impedance to the voltage rectifier and multiplier circuit 170 input impedance. Voltage rectifier and multiplier circuit 170 may feed the received in energy in the form of direct current at a higher voltage to a battery system 180 for energy storage and delivery to a load 190. Battery system 180 may include, for example, one or more batteries and switching and regulatory circuits as needed. Voltage rectifier and multiplier circuit 170 and battery system 180 thus provide power conversion, storage, and management, and may be more briefly referred to as a power or energy converter.

Load 190 may be any electrical or electronic device requiring electrical energy for functioning—such as a UAV having an electronic control or telemetry system, or powered by electric flight motors, for example, or an electric automobile with electric drive motor or motors.

The energy, or signal, fed from each receiver 160 to the voltage rectifier and multiplier circuit 170 may be, for example, a continuous wave signal or an ultra wide band (UWB) coded pulse train transmission whose frequency, or pulse repetition rate, can, for example, exceed 80 GHz. Each receiver 160, of the array of receivers 156, may include an antenna array 210 (also referred to as a tile of a flat panel array structure) such as shown in FIGS. 2A and 2B.

Figure 2A:
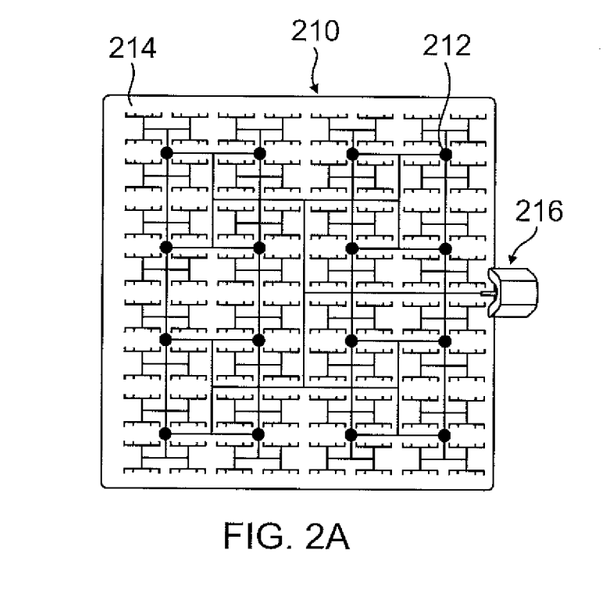
FIG. 2A and FIG. 2B are schematic diagrams showing two examples of power amplifier placement for an antenna array, in accordance with an embodiment.
Figure 2B:
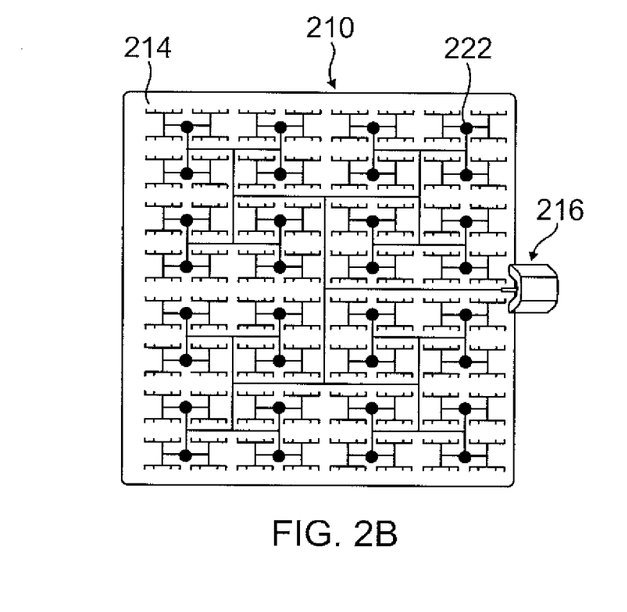

Each transmitter 120 may comprise one or more antenna array tiles 210 (also referred to more briefly as an antenna array or as a tile) such as shown in FIGS. 2A and 2B. The one or more antenna array tiles 210 may be integrated into an antenna array for each transmitter 120. The one or more antenna array tiles 210 for each transmitter 120 may also be integrated into an antenna array for the array 112 of transmitters 120.

Similarly, on the receiver 150 side, each receiver 160 of the array 156 of receivers 160 may comprise one or more antenna array tiles 210 (also referred to more briefly as an antenna array or as a tile) such as shown in FIGS. 2A and 2B. The one or more antenna array tiles 210 may be integrated into an antenna array for each receiver 160. The one or more antenna array tiles 210 for each receiver 160 may also be integrated into an antenna array for the array 156 of receivers 160.

The antenna array (e.g., tile) for each transmitter 120 may provide spatial beam forming of the transmitted RF energy. The array of transmitters 112 (e.g., an array of tiles 210 or an otherwise configured array such as a flat panel arrangement of transmitters 120) may additionally provide beam forming of the transmitted RF energy, which may be coordinated with the beam forming provided by the tiles 210 of the transmitters 120. In other words, multiple arrays 210 of each transmitter 120 (typically 512×512 and 1024×1024 arrays) may be integrated into an array 112 of transmitters 120 (or sensors 120) and may operate, for example, at W-band (also referenced as E-band).

The antenna array 210 (e.g., one or more tiles 210) for each receiver 160 may provide spatial beam forming for receiving the transmitted RF energy 111. The array of receivers 156 (e.g., an array of tiles 210 or an otherwise configured array such as a flat panel arrangement of receivers 160) may additionally provide beam forming of the received RF energy and may be coordinated with the beam forming provided by the tiles 210 of the receivers 160. In other words, multiple arrays 210 of each receiver 160 (typically 512×512 and 1024×1024 arrays) may be integrated into an array 156 of receivers 160 to operate, for example, at W-band (also referenced as E-band). Collectively speaking, both array 112 of sensors 120 and array 156 of sensors 160 provide spatial beam forming for delivery of RF energy 111 from transmitter 110 to receiver 150.

Spatial beam forming may provide beam energy (e.g., RF energy 111) at the surface of receiver 150 having a beam width (measured as an angle) that is less than one degree so that power may be uniformly distributed over the entire array surface (e.g., of array 112 or array 156) for safety of personnel, for example, no "zapping" (e.g., RF burns, radiation burns, or atmospheric discharge—such as sparks and arcing, similar to lightning) of personnel coming into proximity with the wireless energy delivery system 100.

In one or more embodiments, each antenna element (e.g., an antenna element 214 as shown in FIG. 2A or 2B) of receiver 150 may receive the signal (e.g., RF energy in signal 111) that is spread over the entire beam width (effectively all of the area of receiver array 156 of sensors 160). On the receiver side, the spatial beam forming may be thought of as reverse beam forming in space because each receiver antenna element 214 is adding the same amplitude but phase shifted by some proportion (e.g., half) of the wavelength of signal 111. Hence, each antenna element 214 of the receiver 150 may receive the same power, but adds them at the combiner circuit (e.g., spatial combiner 216 as shown in FIG. 2A or 2B) to the total power received so that each antenna element 214 receives only a small amount of the total power. This allows the use of low power, small signal, low noise amplifiers (e.g., amplifiers 212, 222) instead of a more conventional, heavy duty power waveguide. For a 64×64 array of sensors (e.g., array 112 of transmitters 120 or array 156 of receivers 160), for example, the beam width may be about one degree; for larger arrays 112, 156 of sensors, the beam width may be less than one degree. At one kilometer, for example, the beam coverage (e.g., beam width as measured at 3 dB below the peak power) may be about 17 meters and, thus, may cover the entire receiver area (e.g., the entire area of array 156 of sensors 160).

FIG. 2A and FIG. 2B show two alternative examples of amplifier placement—such as for power amplifiers on the transmitter side or low noise amplifiers on the receiver side—for an antenna array 210 for an array of sensors, in accordance with one or more embodiments. Either antenna array 210 (FIG. 2A or FIG. 2B) may be referred to as a "tile". Either tile 210 may integrate amplifiers (e.g., amplifiers 212, 222) that may be power amplifiers for a transmitter 120, or low noise amplifiers for a receiver 160. For example, a tile 210 (e.g., as seen in either of FIG. 2A or FIG. 2B) when implemented with power amplifiers may be included as an array tile 210 for transmitters 120 of the array 112 of sensors 120 or, when implemented with low noise amplifiers, may be included as an array tile for receivers 160 of the array 156 of sensors 160.

FIG. 2A shows a 16×16 antenna array 210, showing the placement of 16 amplifiers 212—implemented in Gallium-Nitride (GaN)—feeding 256 antenna elements 214. FIG. 2A may illustrate, for example, an active array using 16 high-power (e.g., 1 Watt per power amplifier) GaN power amplifiers for 57-64 GHz.

FIG. 2B shows an alternative example of a 16×16 antenna array 210 with 32 amplifiers 222—implemented in Gallium-Arsenide (GaAs)—feeding 256 antenna elements 214. FIG. 2B may illustrate, for example, an active array using 32 medium-power (e.g., 0.1 Watt per power amplifier) GaAs power amplifiers for 57-64 GHz. The 16×16 antenna elements 214 may provide the radiation pattern of FIG. 2C with nearly 30 dBi beam forming gain. The spatial combiner 216 of each tile 210 may be manufactured using an H-tree technique of the planar active array, as seen in FIGS. 2A and 2B.

Figure 2C:
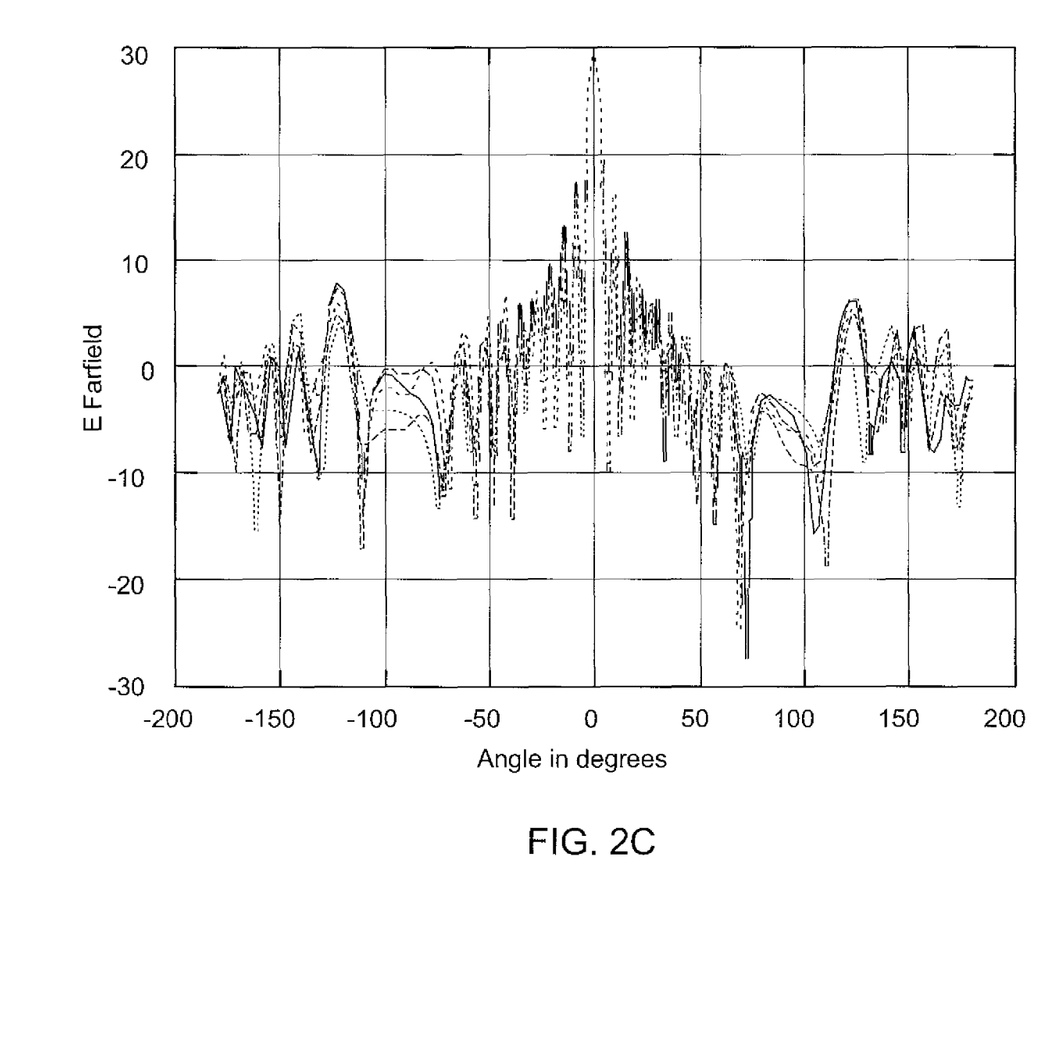
FIG. 2C is a graph showing a radiation pattern for a 16×16 element antenna array tile such as shown in FIGS. 2A and 2B, in accordance with an embodiment.

FIG. 2C is a graph showing a radiation pattern for a 16×16 element antenna array tile such as shown in FIGS. 2A and 2B, in accordance with an embodiment. FIG. 2C shows a radiation pattern of the 16×16 cell for the E-plane (e.g., assuming a linearly-polarized antenna, a plane containing the electric field vector and the direction of maximum radiation).

As seen in FIG. 2C, the 16×16 element antenna array 210 may provide about 30 dBi (decibel isotropic, e.g., forward gain of an antenna compared with a hypothetical isotropic antenna that uniformly distributes energy in all directions) beam forming gain.

Figure 3:
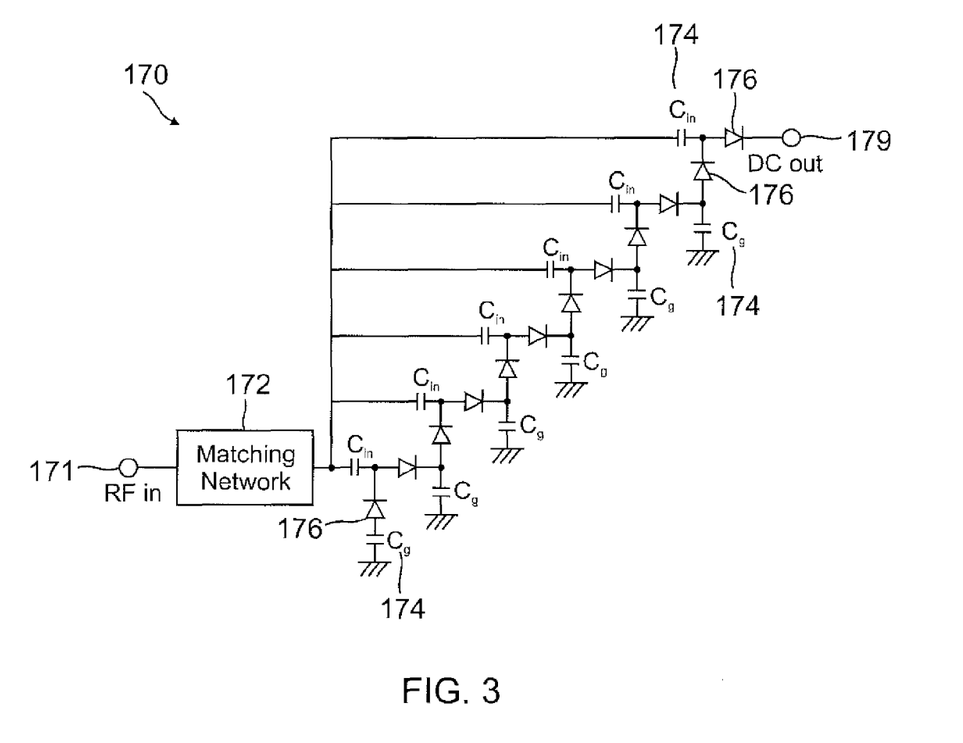
FIG. 3 is a schematic circuit diagram showing an example of an RF to direct current (RF-DC) voltage converter, in accordance with one or more embodiments.

FIG. 3 illustrates an example of a voltage rectifier and multiplier circuit 170 for RF to direct current voltage conversion, in accordance with one or more embodiments. Voltage rectifier and multiplier circuit 170 may include a matching network 172. Matching network 172 may be configured to maximize power transfer between antenna arrays 210 of array 156 of sensors 160 and the voltage rectifier and multiplier circuit 170 by matching the voltage rectifier and multiplier circuit 170 input impedance to the antenna impedance (e.g., impedance of array 156). Matching network 172 may include, for example, inductor-capacitor (LC) leg or π topology matching network.

Voltage rectifier and multiplier circuit 170 may include, for example, capacitors 174 and diodes 176 arranged as shown in FIG. 3 to provide a multistage voltage doubler and rectifier circuit. Each stage may comprise a pair of capacitors 174 and a pair of diodes 176 as shown, and the voltage may be doubled at each stage to result in a significant increase in voltage from RF input 171 to DC output 179.

Voltage rectifier and multiplier circuit 170 may be implemented, for example, using silicon-based Schottky barrier diode technology to exploit its characteristic of high forward current at low voltage, in order to obtain a higher output voltage from weak RF signals.

Figure 4:
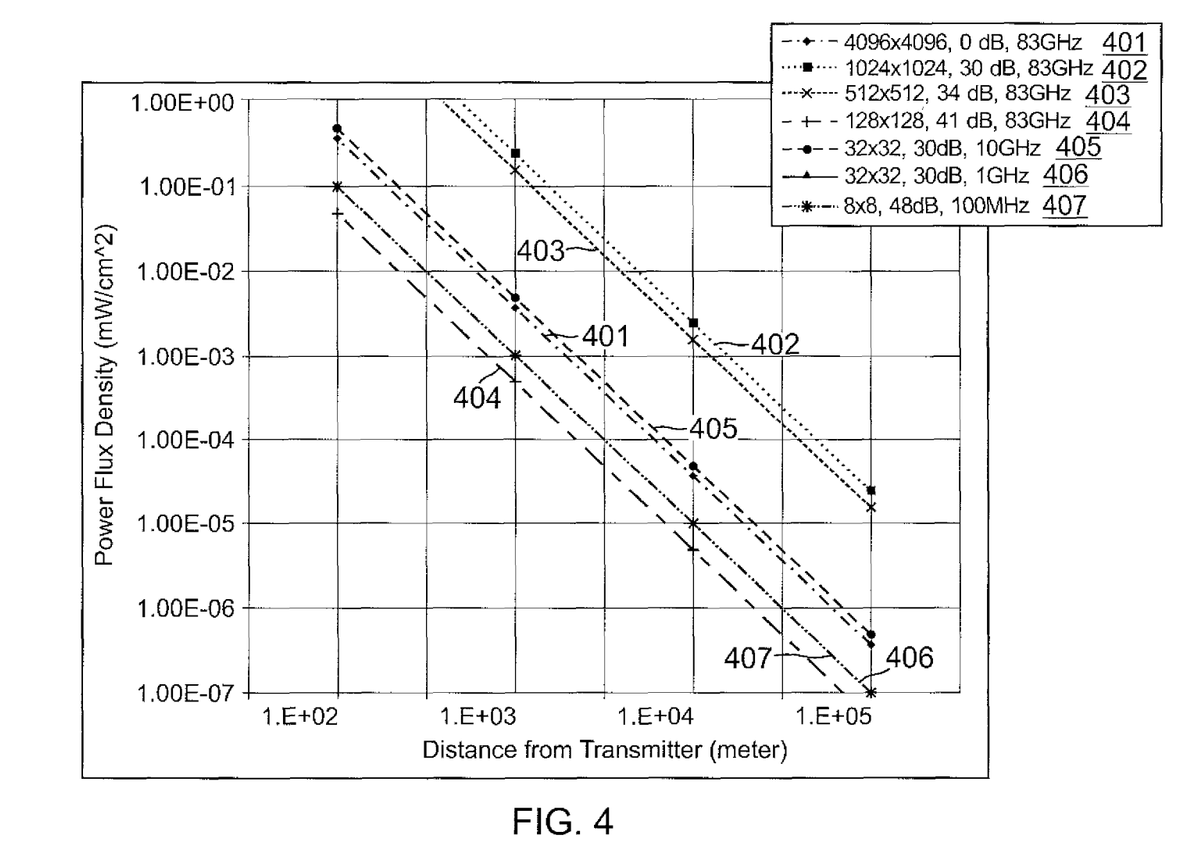
FIG. 4 is a graph showing examples of transmitter frequency and distance vs. collected power flux density, in accordance with one or more embodiments.

FIG. 4 is a graph showing curves of distance vs. collected power flux density for examples 401-407 of embodiments that vary by transmitter frequency and antenna array size. FIG. 4 may demonstrate the power flux density of various technologies vs. distance.

The curve for example 401 corresponds to a 4096×4096 antenna array with 0 dB transmit power at a frequency of 83 GHz. The curve for example 402 corresponds to a 1024×1024 antenna array with 30 dB transmit power at a frequency of 83 GHz. The curve for example 403 corresponds to a 512×512 antenna array with 34 dB transmit power at a frequency of 83 GHz. The curve for example 404 corresponds to a 128×128 antenna array with 41 dB transmit power at a frequency of 83 GHz.

The curve for example 405 corresponds to a 32×32 antenna array with 30 dB transmit power at a frequency of 10 GHz. The curve for example 406 corresponds to a 32×32 antenna array with 30 dB transmit power at a frequency of 1 GHz. The curve for example 407 corresponds to an 8×8 antenna array with 48 dB transmit power at a frequency of 100 MHz (0.1 GHz).

It may be seen from the graph in FIG. 4 that the curves for examples 406 and 407 are nearly co-linear. It may also be seen from the graph in FIG. 4 that the implementation with 1024× 1024 antenna array with 30 dB transmit power at a frequency of 83 GHz (example 402) has the greatest power flux density for a given distance of the examples presented. It may also be seen that the curves for the lower frequency, smaller array size implementations corresponding to examples 405, 406, and 407 are generally in the middle to lower end of the range, of the examples presented, of power flux density for a given distance.

The size of the antenna array (e.g., arrays 210 or the array of sensors 112 or 156) may impose practical constraints for fitting the wireless energy delivery system 100—in particular, the receiver side 150—to the equipment or asset needing to be powered. Thus, a number of considerations may factor into the implementation of wireless energy delivery system 100 for a particular application. While smaller arrays at lower frequencies—e.g., 32×32 antenna array at 10 GHz (example 405); 32×32 antenna array at 1 GHz (example 406); or 8×8 antenna array at 0.1 GHz (example 407) can take advantage of high-power amplifiers at the transmitter, size limitations may prohibit their practical use. A 512×512 array (see curve corresponding to example 403) using only 10 milliwatts (mW) per antenna of transmitted power, for example, may provide the best mechanical fit where size limitations are a constraint such as with a hovering aerial asset (e.g., under a UAV).

Figure 5:
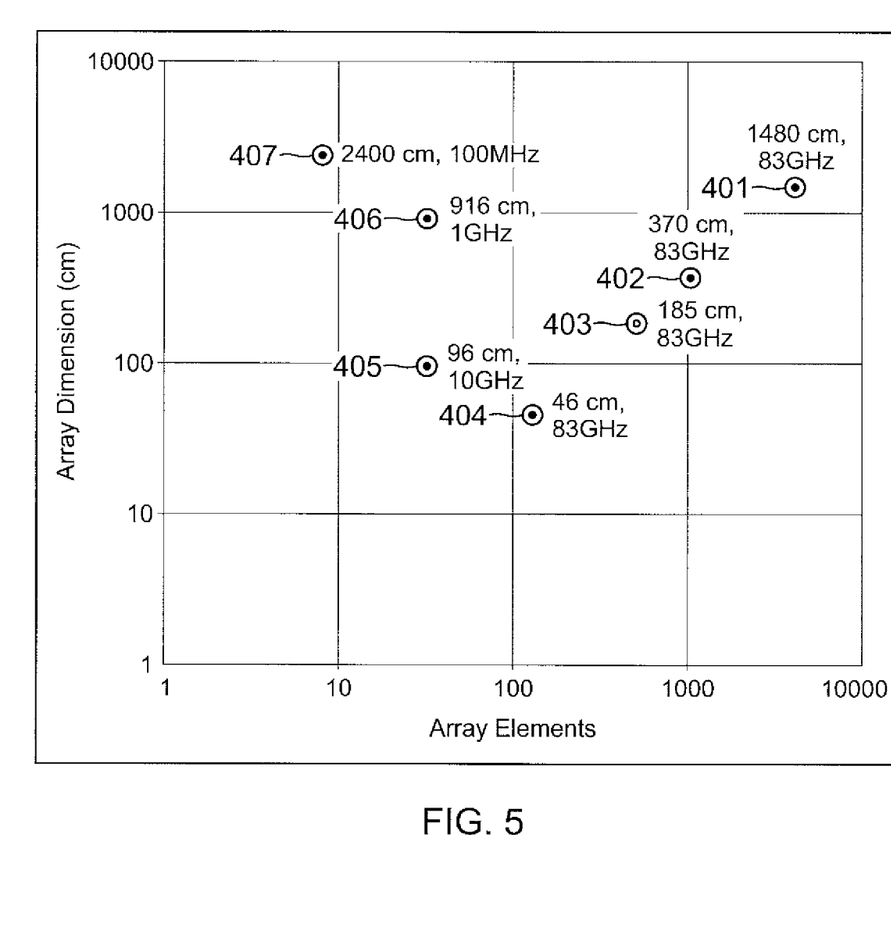
FIG. 5 is a graph showing examples of transmitter frequency and antenna count vs. array size, in accordance with one or more embodiments.

FIG. 5 is a graph showing examples 401-407 of transmitter frequency and antenna count vs. array size, in accordance with one or more embodiments. Points on the graph are numbered 401-407 consistent with the examples shown in FIG. 4.

The size limitation may be more clearly depicted in FIG. 5, where the linear dimension per side of an array is shown on the scale at the left. For example, a constraint of less than 2 meters per side for an array may limit the application of various technologies. As seen in FIG. 5, only examples 403, 404, and 405 meet the constraint of being less than 2 meters per side.

To be able to charge a battery one kilometer (km) away there may be a need for a power flux density of at least 0.2 mW/cm$^2$. In other words, the minimum power flux density for charging at a 1 km distance may be about 0.2 mW/cm$^2$.

For frequency ranges in the upper W-band (e.g., examples 401-404) and terahertz devices, the minimum power flux density for charging at a 1 km distance may be smaller and more integration (resulting in smaller sensor arrays 112, 156, for example) can be performed.

Figure 6:
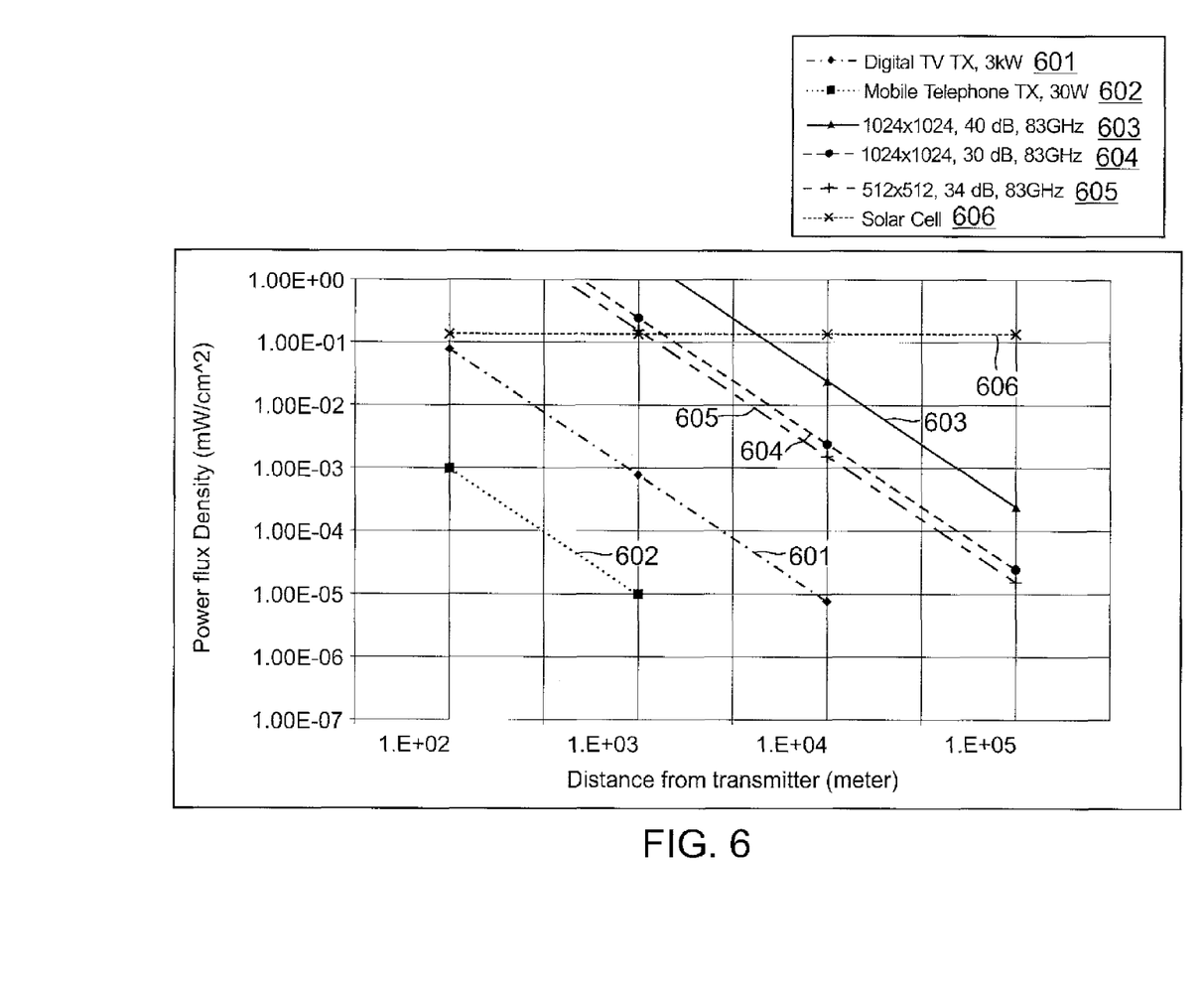
FIG. 6 is a graph showing examples of distance of the receiver from a transmitter vs. power flux density for various RF transmission sources, in accordance with one or more embodiments.

FIG. 6 is a graph showing examples of estimated power flux density at a receiver from various sources according to distance of the receiver from the source transmitter, in accordance with one or more embodiments.

The curve for example 601 corresponds to a digital television (TV) transmission at 3 kilowatts (kW). The curve for example 602 corresponds to a mobile telephone transmission at 30 watts (W).

The curve for example 603 corresponds to a transmission source (e.g., an array 112 of sensors 120) with a 1024×1024 antenna array with 40 dB transmit power at a frequency of 83 GHz. The curve for example 604 corresponds to a transmission source (e.g., an array 112 of sensors 120) with a 1024×1024 antenna array with 30 dB transmit power at a frequency of 83 GHz. The curve for example 605 corresponds to a transmission source (e.g., an array 112 of sensors 120) with a 512×512 antenna array with 34 dB transmit power at a frequency of 83 GHz.

The curve for example 606 corresponds to a solar cell capable of about 0.1 mW/cm$^2$.

For a distance of about 1 km (e.g., 1.E+03 on the abscissa of the graph in FIG. 6) the RF power transmitted by beam forming (e.g., examples 603, 604, 605) may be seen to be more suitable (e.g., having higher values of power flux density) than the power provided by the solar cell (e.g., example 606) and other sources of RF transmission (e.g., examples 601, 602).

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
a radio frequency (RF) transmitter, including an array of transmitters, configured to transmit an RF signal, wherein:
each transmitter of the array of transmitters includes one or more antenna array tiles, each antenna array tile comprising a plurality of power amplifiers configured using an H-tree technique in a flat panel, wafer scale antenna array to provide spatial power combining and beam faulting of the RF signal;
an RF receiver, including an array of receivers, configured to receive the RF signal wherein:
each receiver of the array of receivers comprises a plurality of low noise amplifiers configured using the H-tree technique in a second flat panel, wafer scale antenna array to provide spatial power combining and beam forming of the RF signal; and
a power converter connected to the RF receiver and configured as a multi-stage voltage doubler and rectifier to convert the RF signal to a direct current (DC) output.

2. The system of claim 1, wherein:
the RF receiver comprises an array of sensors wherein:
each sensor includes an antenna array tile; and
the array of sensors is integrated into the flat panel, wafer scale antenna array so that the array tiles operate as a beam forming array.

3. The system of claim 1, wherein:
the flat panel, wafer scale antenna array provides spatial beam forming with a beam width less than one degree.

4. The system of claim 1, wherein:
the flat panel, wafer scale antenna array provides spatial beam forming of the beam energy at the surface of the flat panel, wafer scale antenna array so that power is distributed over the entire surface of the flat panel, wafer scale antenna array.

5. The system of claim 1, wherein:
the flat panel, wafer scale antenna array provides spatial beam forming of the beam energy at the surface of the flat panel, wafer scale antenna array so that power is distributed uniformly over the surface of the flat panel, wafer scale antenna array.

6. The system of claim 1, wherein:
the flat panel, wafer scale antenna array is integrated with low noise amplifiers for receiving the RF signal.

7. The system of claim 1, wherein:
the RF transmitter transmits a either a continuous wave signal or an ultra wide band (UWB) coded pulse train signal.

8. The system of claim 1, wherein each stage of the multi-stage voltage doubler and rectifier comprises:
an input capacitor having a first plate connected to an input of the power converter that is connected to the RF receiver;
a pair of diodes connected in series, including a first diode and a second diode, an anode of the first diode connected through a ground capacitor to ground, a cathode of the first diode connected to a second plate of the input capacitor and to an anode of the second diode, and a cathode of the second diode providing an output of the stage;
wherein the output of each stage is connected to the anode of the first diode of a next stage, and
the DC output of the power converter is taken at an output of a last stage.

9. A method of delivering electrical power wirelessly, the method comprising:
transmitting an RF signal from an array of transmitters, each transmitter including at least one antenna array tile comprising a plurality of power amplifiers configured in a first H-tree feed network in a flat panel, wafer scale antenna array;
providing spatial power combining and beam forming using the array tile to transmit the RF signal with a beam width less than one degree;
receiving the RF signal beam with an array of receivers, wherein each receiver of the array of receivers comprises a plurality of low power, small signal, low noise amplifiers configured in a second H-tree feed network of a second flat panel, wafer scale antenna array;

amplifying a plurality of phase shifted portions of the spatially beam formed RF signal using the low power, small signal, low noise amplifiers;
adding the phase shifted portions of the spatially beam formed RF signal at a combiner circuit; and
feeding the combined signal to a voltage multiplier and rectifier circuit;
converting the combined signal to a direct current (DC) signal using the voltage multiplier and rectifier circuit;
delivering the DC signal to a load.

10. The method of claim 9, wherein:
a first phase shifted portion has approximately the same amplitude but is phase shifted from a second phase shifted portion by some proportion of the wavelength of the signal.

11. The method of claim 9, further comprising:
receiving the signal at an array of receivers, each receiver including a spatially beam forming array of antenna elements.

12. The method of claim 9, further comprising:
receiving the signal at an array of receivers;
spatially beam forming the signal with the low power, small signal, low noise amplifiers at each receiver of the array of receivers;
forming a combined signal from the spatially beam formed signal at each receiver of the array of receivers; and
adding power from the combined signals of the array of receivers for feeding the voltage multiplier and rectifier circuit.

13. The method of claim 9, further comprising:
transmitting the signal using a beam formed array of radio frequency (RF) transmitters so that RF energy in the signal is spread over the entire beam width.

14. The method of claim 9, wherein the voltage multiplier and rectifier circuit comprises a multi-stage voltage doubler and rectifier and each stage of the multi-stage voltage doubler and rectifier comprises:
an input capacitor having a first plate connected to an input of the multi-stage voltage doubler and rectifier that is connected to the combiner circuit;
a pair of diodes connected in series, including a first diode and a second diode, an anode of the first diode connected through a ground capacitor to ground, a cathode of the first diode connected to a second late of the input capacitor and to an anode of the second diode, and a cathode of the second diode providing an output of the stage;
wherein the output of each stage is connected to the anode of the first diode of a next stage, and
converting the combined signal to the DC signal using the voltage multiplier and rectifier circuit further comprises:
taking the DC signal as a DC output of the multi-stage voltage doubler and rectifier at an output of a last stage of multi-stage voltage doubler and rectifier.

15. An apparatus comprising:
an electrical load;
a battery system feeding the load, wherein the battery system includes one or more batteries;
a voltage multiplier and rectifier system configured to recharge the one or more batteries of the battery system and configured as a multi-stage voltage doubler and rectifier to convert a radio frequency (RF) signal to a direct current (DC) output;
a receiver connected to feed power to the voltage multiplier and rectifier system, the receiver including:
an array of RF sensors wherein:
each RF sensor includes an antenna array tile comprising a plurality of low noise amplifiers configured using an H-tree technique in a flat panel, wafer scale antenna array to provide spatial power combining and beam forming of the RF signal; and
the array of RF sensors is integrated so that the array tiles operate as a beam forming array; and
an RF transmitter, including an array of transmitters, configured to transmit the RF signal wherein:
each transmitter of the array of transmitters includes one or more antenna array tiles, each antenna array tile comprising a plurality of power amplifiers configured using an H-tree technique in a second flat panel, wafer scale antenna array to provide spatial power combining and beam forming of the RF signal.

16. The apparatus of claim 15 wherein the array of sensors is arranged in a flat panel configuration.

17. The apparatus of claim 15 wherein the array of sensors has side dimension less than 2.0 meters.

18. The apparatus of claim 15 wherein each stage of the multi-stage voltage doubler and rectifier comprises:
an input capacitor having a first plate connected to an input of the voltage multiplier and rectifier system that is connected to the receiver;
a pair of diodes connected in series, including a first diode and a second diode, an anode of the first diode connected through a ground capacitor to ground, a cathode of the first diode connected to a second plate of the input capacitor and to an anode of the second diode, and a cathode of the second diode providing an output of the stage;
wherein the output of each stage is connected to the anode of the first diode of a next stage, and
the DC output of the voltage multiplier and rectifier system is taken at an output of a last stage.

19. The apparatus of claim 15 wherein at least two of the array tiles are integrated into a flat panel, wafer scale antenna array.

20. The apparatus of claim 15 wherein:
each sensor includes a receiver and at least one array tile; and
the array of sensors is integrated into a flat panel, wafer scale antenna array.

* * * * *